United States Patent [19]

Nijman et al.

[11] 4,306,122

[45] Dec. 15, 1981

[54] TELEPHONE LINE CIRCUIT

[75] Inventors: Aloysius J. Nijman; Franciscus A. C. M. Schoofs, both of Eindhoven, Netherlands

[73] Assignee: U.S. Philips Corporation, New York, N.Y.

[21] Appl. No.: 142,276

[22] Filed: Apr. 21, 1980

[30] Foreign Application Priority Data

May 10, 1979 [NL] Netherlands .................. 7903662

[51] Int. Cl.³ .................................................. H04B 1/58
[52] U.S. Cl. ............................ 179/170 NC; 179/16 F
[58] Field of Search ........ 179/170 NC, 170 R, 170 T, 179/16 F, 16 A, 18 F, 18 FA, 81 R, 81 B, 77

[56] References Cited

U.S. PATENT DOCUMENTS

| | | | |
|---|---|---|---|
| 4,004,109 | 1/1977 | Boxall | 179/170 NC |
| 4,037,065 | 7/1977 | Nahay | 179/170 NC |
| 4,041,252 | 8/1977 | Cowden | 179/170 NC |
| 4,086,447 | 4/1978 | Schindler et al. | 179/170 NC |
| 4,142,075 | 2/1979 | Olschewski | 179/170 NC |
| 4,203,012 | 5/1980 | Boxall | 179/170 NC |

Primary Examiner—Thomas A. Robinson
Attorney, Agent, or Firm—Thomas A. Briody; William J. Streeter; Laurence A. Wright

[57] ABSTRACT

The line circuit comprises at least a driver stage 1 having an amplifier. This amplifier is provided with a feedback circuit for forming a virtual output impedance which functions as a supply resistor so that additional collector space is created for the amplifier output transistor. In addition, the line circuit comprises a controlled supply source 5 connected to the amplifier output transistor for eliminating this additional collector space, which results in a low-dissipation line circuit.

11 Claims, 7 Drawing Figures

TELEPHONE LINE CIRCUIT

The invention relates to a telephone line circuit comprising at least one driver stage which comprises a first signal input for the connection to an a.c. signal source and a linear amplifier having an output transistor, the output transistor being coupled to a first terminal for the connection to a subscriber's line and also to a supply source for applying a direct current to the terminal, via the main current path of the output transistor.

Such a circuit is known from the U.S. Pat. No. 4,041,252.

BACKGROUND OF THE INVENTION

Subscriber's exchanges operating on the basis of time division multiplex or small spatial networks require a cheap subscriber's line circuit on a "one per line" basis. This can be realised by means of the highest possible degree of integration of the line circuits as well as by means of the highest possible packing density of these line circuits on a printed circuit board in a rack of a telephone exchange.

In order to supply the line direct current, the supply source of the prior art line circuit comprises a d.c. voltage source which usually supplies a voltage of 48 Volt or 60 Volt. The value of this line current depends on the lengths of the subscriber's line. To prevent too high a line current from flowing when very short lines are used or in the event of a short circuit of the subscriber's line, the administrations require a supply resistor of 400 to 800 Ohms to be included in series with the line. This value has been chosen so that the direct current is still of a sufficient value (approximately 20 mA) for very long subscriber's line and that the maximum direct current is limited to 400 to 120 mA.

Since a subscriber's line is a symmetrical two-wire transmission line, it must be terminated with the impedance of the subscriber's line to ensure optimum transmission of the speech signals and, for each wire of the subscriber's line, the line circuit must include an amplifier which is of such a construction that the line circuit is also of a symmetrical construction. Thus, the supply resistor in the line circuit described in the above-mentioned U.S. Pat. has been realised by means of two resistors, each of which is arranged in series with a respective wire of the subscriber's line, each resistor having half the value of the supply resistor. These resistors constitute at the same time the terminating impedance of the subscriber's line.

In order to prevent common mode signals occurring on the subscriber's line (originating, for example, from a capacitive coupling of the two wires to common mode noise sources, such as unbalanced adjacent channels or the main supply) from being converted into differential mode signals owing to resistors whose values are not equal, the administrations require an accuracy of approximately 0.1% for the said resistors. At the above-mentioned values of the resistors and supply voltages, each of these resistors could dissipate up to about 3 Watts with very short lines, which, in combination with the required accuracy of 0.1%, renders these resistors expensive. In addition, a plurality of line circuits are mounted on one p.c. board in one rack of the telephone exchange. The above-mentioned large dissipation in the resistors is the reason that the packing density on a p.c. board cannot be high or that forced cooling of a large capacity is required.

It is an object of the invention at least to mitigate these drawbacks and to provide a line circuit the dissipation of which is considerably reduced with respect to the known line circuit.

SUMMARY OF THE INVENTION

According to the invention a line circuit as defined in the opening paragraph is characterized in that the driver stage comprises a feedback circuit connected between a current path through which current in the main current path of the output transistor flows and an input of the amplifier for applying to the input of the amplifier a voltage which is proportional to the current in the said main current path in order to establish at least a partly virtual predetermined amplifier output impedance which represents the line supply resistor, and in that the supply source comprises a controlled supply source, as herein defined.

A controlled supply source is herein defined as a supply source whose output voltage varies substantially linearly versus the consumed current with a proportionality constant which is approximately equal to the line supply resistor value prescribed by the administrations or to a portion of this line supply resistance determined in dependence upon the feedback circuit.

The output impedance created by means of the feedback circuit constitutes the terminating impedance of the subscriber's line. When current flows through the output transistor this output impedance works out in an excess of maximum tolerable emitter-collector voltage swing of the output transistor. This excess in voltage swing is eliminated by means of the controlled supply source, so that no dissipation occurs in the output transistor other than the residual dissipation which is determined by the line current and a bias voltage of approximately 6 Volts for the output transistor which is required for distortion-free reproduction of the speech signal from the signal source. The dissipation is thereby displaced from the p.c. board to the supply source.

In accordance with a preferred embodiment, the line circuit is characterized in that the amplifier has a predetermined gain factor and the main current path of the output transistor is connected to the terminal via a first resistor and the feedback circuit comprises a voltage divider arranged between a reference voltage source and the terminal, the tap of this divider being connected to the signal input of the amplifier. This results in that the output impedance determined by the first resistor, which has a value which is lower by a value which is proportional to the division ratio of the voltage divider than the value of the requisite supply resistor, resulting in that the dissipation in the first resistor is lower by a value which is proportional to the divider ratio than the dissipation in a first supply resistor without feedback loop.

In accordance with a further preferred embodiment the line circuit is characterized in that the amplifier is a differential amplifier having a signal-inverting input, a signal non-inverting input and a signal output, the signal output being formed by one end of the main current path of the output transistor which is connected to the terminal, that the feedback circuit comprises a current amplifier having a common terminal connected to the pole of the controlled supply source, a current input connected to the other end of the main current path of the output transistor and a current output connected to the signal inverting input of the amplifier via a second resistor, that the line circuit comprises a reference voltage source one pole of which is connected to the signal non-inverting input of the amplifier and the other pole to the current output point of the current amplifier via a third resistor and that a fourth resistor is connected between the signal inverting input of the amplifier and the terminal. This embodiment has the advantage that the supply and line terminating impedance is wholly constituted by the output impedance of the amplifier.

In accordance with a further construction the line circuit is characterized in that the controlled supply comprises a voltage source having an internal impedance which is related to the said otuput impedance. Thus, the dissipating element has been transferred from the driver stage to the supply source.

In order to reduce the dissipation in the supply source, the line circuit is further characterized in that the voltage source comprises a pulse generator, the internal impedance comprises an inductance connected to the pulse generator, and a first rectifier circuit connected to the inductance, the output of this rectifier circuit constituting a pole of the supply source.

In accordance with a still further construction the line circuit comprises a second driver stage which is complementary to the above-mentioned driver stage, an output transistor of the amplifier of the second driver stage being coupled to a second pole of the supply source for taking, via the main current path of the output transistor of the second driver stage, the direct current and the alternating current superimposed thereon and originating from the signal source which is connected to a second signal input, from the other subscriber's line wire connected to a second terminal, characterized in that the controlled supply comprises a detection device which is coupled to both driver stages for determining a difference signal which is proportional to the difference in the voltage between the output of the amplifiers and the poles of the supply source, and that the controlled supply comprises a control input which is coupled to an output of the detection device for applying the supply voltage, which is proportional to the difference signal thus determined to the output transistors.

This embodiment has the advantage that the large emitter-collector voltages produced during the formation of the output impedances are eliminated, the dissipation occurring in the supply resistors of the prior art line circuit thus being avoided.

In accordance with a still further construction, a line circuit comprising a second driver stage which is complementary to the above-mentioned driver stage, is characterized in that the controlled supply comprises an analog-to-digital converter, coupled to the two driver stages, for converting the voltage between the outputs of the amplifiers of the driver stages into a digital input signal, a storage device connected to the analog-to-digital converter, a conversion table being stored in this storage device for converting the digital input signal into adigital output signal which is representative of a supply voltage associated with that input signal, a digital-to-analog converter connected to the storage device for converting the digital output singal into an analog signal voltage, a second converter connected to the digital-to-analog converter for converting the signal voltage applied to the converter into a pulse duration modulated pulse train the pulse duration of which is proportional to the amplitude of the voltage of the signal voltage applied to the converter, and a third rectifier circuit, coupled to the converter, the output terminals of the rectifier circuit constituting the pulse of the supply source.

By means of this embodiment it is possible to choose in a simple manner, for any voltage between the output of the differential amplifiers, that is to say for any line current, the supply voltage of the output transistors of differential amplifiers such that the dissipation is at a minimum.

BRIEF DESCRIPTION OF THE DRAWINGS

Embodiments of the invention will now be further explained with reference to the accompanying drawings, in which corresponding elements are given the same reference numerals and in which.

DESCRIPTION OF THE PREFERRED EMBODIMENTS

Figure 1:
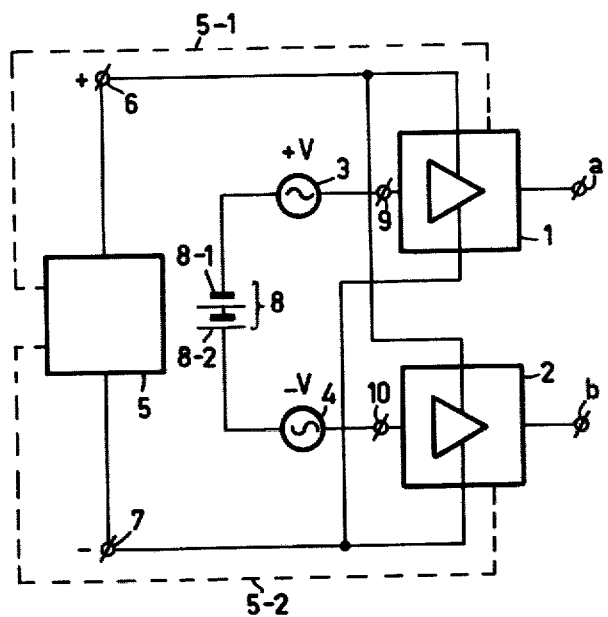
FIG. 1 is a block diagram of a line circuit according to the invention.

The block schematic circuit diagram shown in FIG. 1 of a line circuit for use in a telephone exchange comprises two driver stages 1 and 2, having respective terminals a and b for the connection of the a- and b-wires of a subscriber's line, not shown. A signal source comprising voltage sources 3 and 4 is connected to the signal inputs 9 and 10 of these driver stages, these voltage sources applying speech signals V and −V with opposite phases to the driver stages 1 and 2 for imposing these speech signals on the subscriber's line. In addition, the line circuit comprises a supply source 5 whose first pole 6, the positive pole, and a second pole 7, the negative pole, are connected to the driver stages 1 and 2 for feeding these stages and for applying a d.c. line current to the subscriber's line.

The value of the line current is not only determined by the voltage of the supply source 5 and a reference source 8 and the impedances of the driver stages 1 and 2, but also by the length of the subscriber's line. In order to be capable of supplying sufficient current to very long subscriber's lines, the supply voltage of source 5 is normally 48 or 60 Volts and, in order to limit the line current for very short subscriber's lines or in the event of a short-circuit on the subscriber's line the administration require the line current to be supplied via supply resistors having a value of 200 to 400 Ohms each. Consequently, at the above-mentioned values of the supply voltage, the dissipation in each of the supply resistors has approximately 3 Watts.

Owing to the fact that the supply resistors constitute terminating impedances of the subscriber's line, it is necessary to prevent so-called common mode signals on the subscriber's line, for example current signals induced in the two wires, from being converted into so-called differential mode signals owing to inequality of the supply resistors. To that end the administrations require an accuracy for the terminating impedances of approximately 0.1%. Resistors which have an accuracy of 0.1% and which can dissipate 3 Watts are relatively large and expensive and hence, undesirable.

To obviate the need for such a resistor, each driver stage comprises an amplifier the output impedance of which is determined by feedback and by using a controlled supply source as their supply source.

Figure 2:
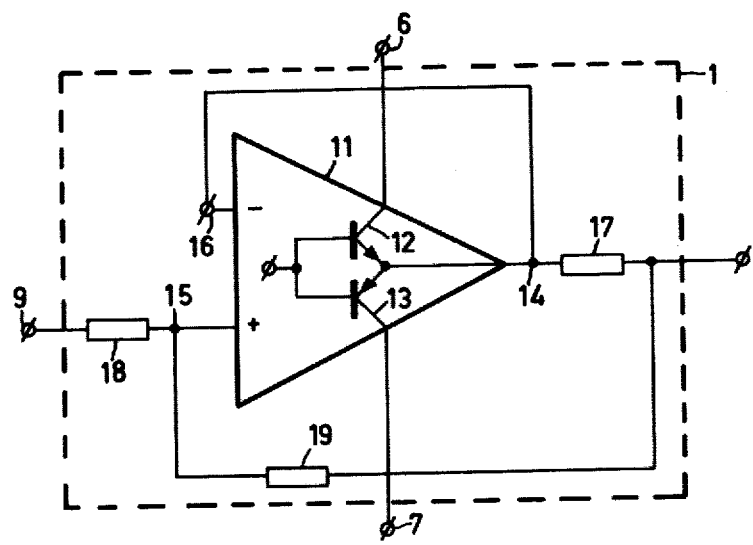
FIG. 2 shows a driver stage for use in the line circuit shown in FIG. 1.

FIG. 2 shows a driver stage which has an output impedance determined by so-called impedance multiplication and which is therefore suitable for use in the line circuit of FIG. 1.

This driver stage comprises an amplifier 11 having two complementary output transistors 12 and 13, which are implemented as parallel-arranged emitter followers with their emitters connected to the output 14. The base of these transistors are interconnected and coupled, in a manner not shown, to the signal non-inverting input 15 and to the signal-inverting input 16. Such an amplifier is commercially available and known as an "opamp" (operational amplifier). The amplifier 11 is connected to the output terminal via a first resistor 17.

For producing the line current, the collectors of the output transistors 12 and 13 are respectively connected to the poles 6 and 7 of the controlled supply source. If a positive reference voltage is applied to the signal non-inverting input 15, for example by connecting the positive pole of the reference voltage source 8, shown in FIG. 1, to signal input 9, the line current flows from the positive pole of the controlled supply source to the terminal a via the main current path of output transistor 12 and the first resistor 17, provided a load is present between the a and b terminals.

When a negative reference voltage is applied to the signal non-inverting input 15, for example by connecting the negative terminal of the reference voltage source 8, shown in FIG. 1, to terminal 9, the line current flows from the terminal a to the negative pole 7 of the controlled supply source 5 via the first resistor 17 and the main current path of output transistor 13.

The value of the current is inter alia determined by the value of the first resistor 17. To ensure that a low-value resistor will suffice, a feedback circuit is provided between the terminal a and the signal non-inverting input 15 of the amplifier 11. This feedback circuit comprises part of a voltage divider, consisting of resistors 18 and 19, and a reference voltage source connected to the input 9 and constituted by the reference voltage source 8 of FIG. 1. To obtain an amplifier having a defined gain factor, the output 14 of the amplifier 11 is connected to the signal-inverting input 16 of the amplifier.

It can be demonstrated that at a very high gain factor of the opamp the output impedance $R_o$, looking out from terminal a is equal to $[(R_{19}+R_{18})/(R_{17}+R_{19})]R_{17}$. Herein, the subscript numerals of the resistors denoted by R correspond to the feference numerals of those resistors in FIG. 2.

With a suitable choice of the values of these resistors, for example $R_{19}=1$ kohm and $R_{18}=9$ kohms, an output impedance $R_o$ of 200 and 400 Ohms, respectively, is obtained at a value of 20 and 40 Ohms, respectively, for $R_{17}$.

The remaining 180 and 360 Ohms, respectively, of the terminating or supply resistors are constituted by the electronic impedances of the output transistors 12 and 13.

This has the advantage that the first resistor 17 does not dissipate more than 0.3 W. Although this resistor must have an accuracy of 0.1%, it is relatively cheap because of its low impedance and dissipation.

When the line circuit is used for only one current direction, one output transistor, for example output transistor 13, can be omitted. Furthermore, the amplifier 11 of the second driver stage is complementary to the amplifier of the first driver stage 1. That is to say that at least the output transistor, for example transistor 12 of the second driver stage 2, is complementary to the output transistor 12 of the first driver stage 1. When the amplifier 11 is suitable for both current directions as shown in FIG. 2, it comprises output transistor 13, which is complementary to the first output transistor 12, which means that in that case the amplifiers of the first and the second driver stages are identical and, consequently, also the driver stages 1 and 2.

Further, an alternative type of amplifier can be used provided it has a defined gain factor. It is alternatively possible to exchange the collector connections of the output transistors 12 and 13 for the emitter connections. In that case the bases of the output transistors 12 and 13 must be controlled with respect to the voltages of the poles 6 and 7 of the supply source.

Figure 3:
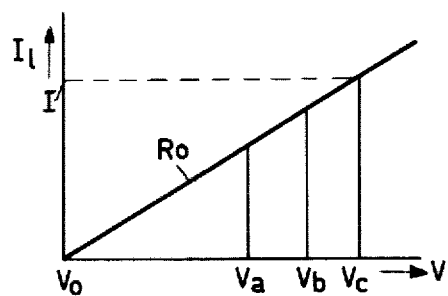
FIG. 3 is a graph in which the output current is plotted versus the supply voltage of the driver stage shown in FIG. 2.

In FIG. 3 the line current $I_1$ is plotted versus the voltage V across the output impedance Ro. With a supply voltage Vc and a line current I a voltage equal to Vc − Vb is produced across the first resistor 17. To have the amplifier operate as a class A amplifier, a d.c. voltage space of Vb − Va, for example 6 Volts, is required for the speech signal.

The voltage Vb − Vo is the collector-emitter voltage of the output transistor and Va − Vo constitutes the excess in collector voltage space thereof, which space can be eliminated by means of the controlled supply source 5, shown in FIG. 1.

With the above-mentioned values of the resistors shown in FIG. 2, namely 20 Ohms, a reference voltage of 40 Volts at input 9 and of 60 Volts at input 10 (FIG. 1) and a short subscriber's line having a resistance of, for example, 200 Ohms being connected between the terminals a and b, a value of 24 Volts for the d.c. voltage between the output 14 of the amplifier 11 and the corresponding input of the amplifier in the driver stage 2 is sufficient to produce a line current of 100 ma. When the d.c. voltage is set to 6 Volts for amplifying the speech signals, the controlled voltage source must produce a voltage of 36 Volts. The dissipation of the output transistors 12 and 13, respectively, will then not exceed 0.6 Watt.

Figure 4:
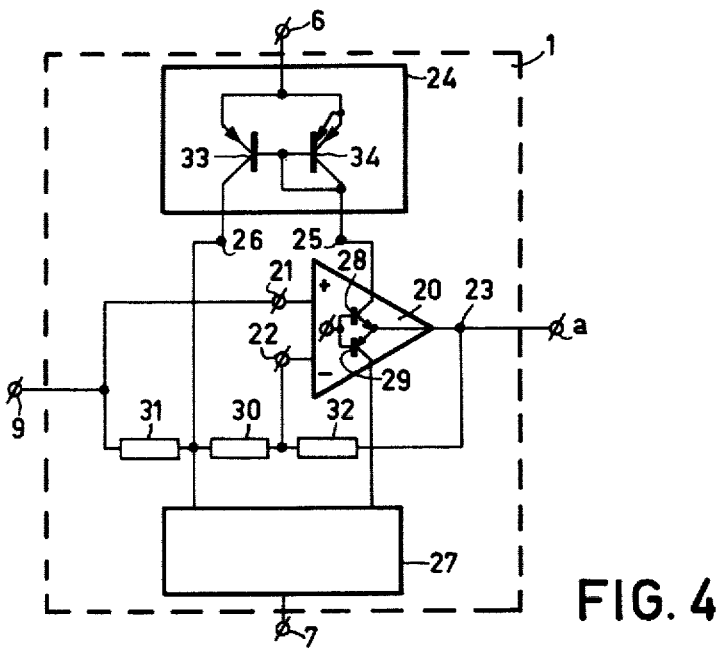
FIG. 4 shows a further driver stage for use in the line circuit shown in FIG. 1.

FIG. 4 shows a further embodiment of a driver stage having an output impedance realised in an electronic way. This driver stage comprises a high-gain stage, not shown, and a power output stage, comprising complementary transistors 28 and 29, which has the current path of its output signal connected to the terminal 23. The supply voltage for the above-mentioned high gain amplifier stage, is, for example, directly obtained from the pole 6 of the supply source. The signal non-inverting input 21 of the amplifier 20 is connected to the signal input 9 and the output 23 to the a terminal.

A feedback circuit is comprising a current amplifier 24 having a common terminal connected to the pole 6 of the controlled supply source, a current input 25 connected to the main current path of the output transistor 28 of the amplifier 20 and a current output 26 connected to the signal-inverting input 22 via a second resistor 30 and to the signal input 9 via a third resistor 31, is provided to obtain a virtual output impedance. In addition, the output 23 is connected to the signal-inverting input 22 via a fourth resistor 32.

The current amplifier 24 may be any known type of current amplifier. By way of example the current amplifier shown comprises two transistors 33 and 34, the emitters of which are connected to the common terminal, the bases are interconnected and connected to the collector of the transistor 34 constituting the current input 25, and to the collector of the transistor 33 constituting the current output.

If it is assumed that the output current from transistor 33 is a factor of $\alpha^{-1}$ greater than the input current to transistor 33, it can be demonstrated that the output impedance $Z_o$ of the amplifier 20 is equal to $R_{31}R_{32}/[R_{31}+\alpha(R_{30}+R_{31})]$, wherein the reference numerals of the resistors denoted by R correspond to the reference numerals of the resistors shown in FIG. 4.

To allow line current to be taken from the terminal a by the amplifier 20, the output transistor 29 is connected to a second current amplifier 27, which is complementary to the current amplifier 24, the common terminal of amplifier 27 being connected to the pole 7, the current input to the main current path of the complementary output transistor 29 of the amplifier 20 and the current output to the junction of the second resistor 30 and the third resistor 31.

The excess of the collector voltage space created by the electronic output impedance and the current through the transistor here also eliminated by means of the controlled supply source 5.

Figure 5:
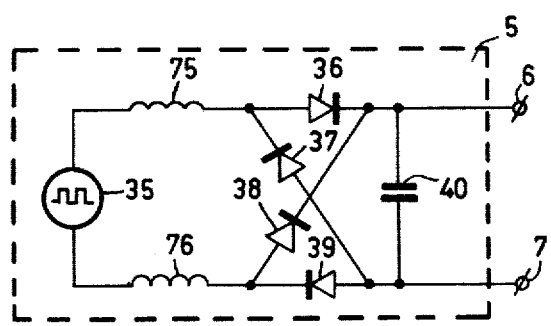
FIG. 5 shows a controlled supply source for use in the line circuits shown in FIG. 1.

FIG. 5 shows a controlled supply source which is very suitable for this purpose.

This source comprises a pulse generator 35 having a pulse repetition rate of, for example, 100 kHz and two coils 75 and 76 connected to the pulse generator each having a value of, for example 0.29 or 0.59 mHz. A rectifying circuit 36 to 39 inclusive, whose d.c. outputs are connected to the poles 6 and 7 of the controlled supply source 5 (FIG. 1), is connected to these coils. A smoothing capacitor 40 is connected between the poles 6 and 7.

The current supplied by the pulse generator 35 flows through the coils 75 and 76 whereafter it is rectified in the rectifying circuit 36 to 39, inclusive, and smoothed by the capacitor 40. The direct current thus obtained is applied as a direct current to the subscriber's line via the output transistors of the driver stages 1 and 2. With the above-mentioned values each impedance, formed by the coils 75 and 76, has a value of approximately 180 and approximately 360 Ohms, respectively, equal to the output impedances of the amplifiers of the driver stages 1 and 2.

Compared with a supply source constructed from a fixed d.c. voltage source having a resistor of 180 or 360 Ohms connected to each pole, this supply source defined as controlled supply source has the advantage that it dissipates very little power. A large part of the dissipation in the resistors of 180 and 360 Ohms, respectively, is prevented from occurring when the last-mentioned controlled supply is used.

In the embodiments so far described, the line current is directly controlled by the current supplied by the supply source.

Figure 6:
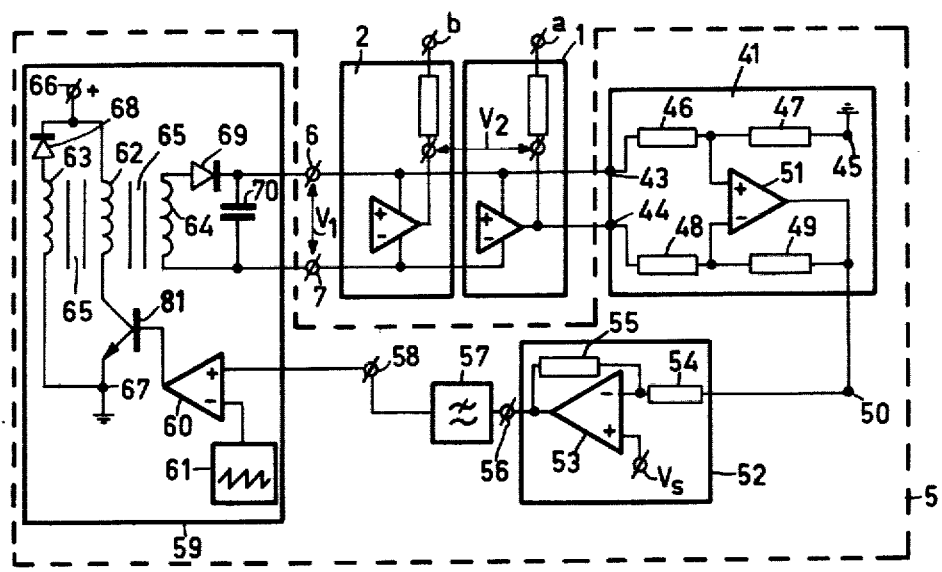
FIG. 6 shows a controlled supply source for use in the line circuit shown in FIG. 1, comprising driver stages as shown in FIG. 2.

FIG. 6 shows a detailed construction of a controlled supply source 5, which is indirectly controlled by the line current. This controlled supply source comprises a detection device 41 which has an input terminal 43 connected to a pole 6 of this supply source and an input terminal 44 connected to the output of the amplifier 11 of the control stage 1, whose detailed construction is shown in FIG. 2, this connection being shown in FIG. 1 by means of the broken line 5-1 in FIG. 1.

For a voltage $V_1$ between the poles of the supply source and a voltage $V_2$ between the outputs of the amplifiers 11, the voltage between the input terminals 43 and 44 of the detection device 41 is equal to $(V_1-V_2)/2$.

The detection device 41 comprises a first series arrangement of two resistors 46 and 47 connected between the input terminal 44 and a common earth 45, and an identical series arrangement of two resistors 48 and 49 connected between the input terminal 44 and an output terminal 50. In addition, the detection device comprises a differential amplifier 51 whose signal non-inverting input is connected to the junction point of the resistors 46 and 47, the signal-inverting input to the junction point of the resistors 48 and 49, and the signal output to the output terminal 50.

If the ratio between the resistors 47 and 46, and also between the resistors 49 and 48 is $\beta: 1$, the output voltage at the output terminal 50 is equal to $(V_1-V_2)/2\beta$.

A differential amplifying circuit 52 is connected to the output terminal 50 for amplifying the difference between the output voltage at the output terminal 50 and a reference voltage Vs, to supply the required setting voltage, for example 6 Volts, for the amplifier in the driver stages 1 and 2 to have this amplifier of the driver stages operate as a class A amplifier.

This differential amplifier circuit 52 comprises an inverting differential amplifier which is comprised of an operational amplifier 53, resistors 54 and 55 connected between the output terminal 50 and the signal inverting input of the opamp and between the signal-inverting input and the output terminal 56 of the differential amplifier circuit, respectively. The voltage $V_s$, with which the input voltage is compared to obtain a desired controlled signal voltage, is applied to the signal non-inverting input of the opamp 53. In addition a low-pass filter 57 is connected to the output terminal 56. This low-pass filter that is connected into a voltage regulation loop (see FIG. 2) has a cut-off frequency which is below the switching frequency of a device 59 and which has for its purpose to suppress the switching frequency of the device 52, when the cut-off frequency is chosen above the speech band of the telephony signals, the supply voltage varies with the voltage of the speech signals. Should this feature not be wanted, then the cut-off frequency of the filter may be chosen below this speech band, the voltage of the supply source then being prevented from being influenced by the speech signals. It should be noted that, when the supply voltage varies with the speech signals, the voltage Vb−Va of FIG. 3 must be chosen below 6 Volts, which has the advantage of a still lower dissipation in the p.c. board.

The control signal voltage thus obtained is applied to a control input 58 of a device 59, which comprises a converter consisting of a differential amplifier 60 and a sawtooth generator 61 connected to the signal-inverting input, the signal non-inverting input being connected to the control terminal 58. This converter converts the amplitude of the control signal in known manner into the pulse width of a pulse train. This pulse train is applied to a base of a transistor 81 whose main current path is connected in series with a first winding 62 of a transformer 65, between a first pole 66 and a second pole 67 of a d.c. voltage source, not shown, the second pole 67 being connected to the common earth. In addition, the series arrangement of a second winding 63 of the transformer 65 and a diode 68 is connected between the poles 67 and 66.

During the occurrence of a pulse transistor 81 conducts and a current flows through winding 62 from pole 66 to pole 67. The voltage in the windings reverses at the end of each pulse and the current then flowing in the second winding 63 is fed back to the source.

The transformer 65 comprises a third winding 64 to which a second rectifying circuit is connected, which comprises a diode 69 and a smoothing capacitor 70. The current flowing in the first winding during the occurrence of a pulse introduces a voltage in the third winding which constitutes the controlled supply voltage supplied by the controlled voltage source after rectification by means of the diode 69 and smoothing by means of the capacitor 70.

Figure 7:
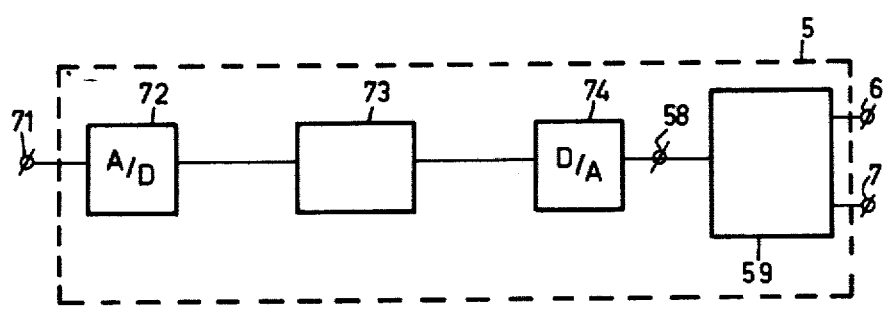
FIG. 7 shows a controlled supply surface source for use in the line circuit as shown in FIG. 1, comprising driver stages as shown in FIG. 2 or FIG. 4.

FIG. 7 shows a further embodiment of a controlled supply source 5 for use in the line circuit shown in FIG. 1.

This controlled supply source 5 comprises an analog-to-digital converter 72 the input 71 of which is connected to the output of the amplifiers of the driver stages 1 and 2, as shown schematically in FIG. 1 by means of the broken lines 5-1 and 5-2. The difference voltage of the output of the amplifiers which is denoted in FIG. 6 by $V_2$ is converted into digital signals in the A/D converter 72. These digital signals are applied as addresses to a storage device 73 in which a table for converting the measured output voltage $V_2$ into a voltage which is representative of the desired (controlled) supply voltage $V_1$ (see FIG. 6) is stored in digital form. The value of a voltage which is representative of the desired supply voltage and which is stored in digital form at a given address, is applied to a digital-to-analog converter 74 when that address is energized, the digital output signal being converted into the representative analog voltage form in the last-mentioned converter. This representative voltage is applied as the control signal to the control input 58 of the device 69, which has already been explained with reference to the circuit diagram of this device shown in FIG. 6. The supply voltage obtained between the poles 6 and 7 can easily be an optimally controlled supply voltage as the conversion table can in advance optimally determine for once in an experimental way.

What is claimed is:

1. A telephone line circuit comprising at least one driver stage which comprises a first signal input for the connection to an a.c. source and a linear amplifier having an output transistor, the output transistor being coupled to a first terminal for the connection to a subscriber's line and also to a supply source for applying a direct current to the terminal via the main current path of the output transistor, characterized in that the driver stage comprises a feedback circuit connected between a current path through which the current of the main current path of the output transistor flows and an input of the amplifier for applying to the input of the amplifier a voltage which is proportional to the current in the main current path of the output transistor for establishing at least a partly virtual predetermined output impedance, which represents the line supply resistor and wherein said supply source comprises a controlled supply source.

2. A line circuit as claimed in claim 1, characterized in that the amplifier has a predetermined gain factor and the main current path of the output transistor is connected to the first terminal via a first resistor and the feedback circuit comprises a voltage divider arranged between a reference voltage source and the terminal, a tap of this voltage divider being connected to the signal input of the amplifier.

3. A line circuit as claimed in claim 2, characterized in that the amplifier is a differential amplifier having a signal-inverting input, a signal non-inverting input and a signal output, the signal output being through-connected in the signal-inverting input and the signal non-inverting input being the first signal input of the driver stage.

4. A line circuit as claimed in claim 1, characterized in that the amplifier is a differential amplifier having a signal non-inverting input, a signal-inverting input and a signal output, the signal output being constituted by one end of the main current path of the output transistor which is connected to the terminal, in that the feedback circuit comprises a current amplifier having a common terminal, a current input and a current output, the common terminal being connected to the pole of the controlled supply, the current input being connected to the other end of the main current path of the output transistor and the current output to the signal-inverting input of the amplifier via a second resistor, in that the line circuit comprises a reference voltage source one end of which is connected to the signal non-inverting input of the amplifier and the other end to the current output of the current amplifier via a third resistor and in that a fourth resistor is connected between the signal-inverting input of the amplifier and the terminal.

5. A line circuit as claimed in any one of the preceding claims, characterized in that the controlled supply comprises a voltage source having an internal impedance which is substantially proportional to the said output impedance.

6. A line circuit as claimed in claim 5, characterized in that the voltage source comprises a pulse generator, the internal impedance comprises an inductance connected to the pulse generator, and a first rectifier circuit connected to the inductance, the output of the rectifier circuit constituting the pole of the supply source.

7. A line circuit as claimed in any one of the claims 1 to 4, inclusive, comprising a second driver stage complementary to the said driver stage, an output transistor of the amplifier of the second driver stage being coupled to a second pole of the supply source for taking, via the main current path of the output transistor, the direct current and the alternating current superimposed thereon and coming from the signal source which is connected to a second signal input from the other subscriber's line wire connected to a second terminal, characterized in that the controlled supply comprises a detection device which is coupled to both driver stages for determining a difference signal which is proportional to the difference in the voltages between the outputs of the amplifiers and the poles of the supply source, and that the controlled supply comprises a control input coupled to an output of the detection device for applying a supply voltage which is proportional to the determined difference signal to the output voltage.

8. A line circuit as claimed in claim 7, characterized in that a first low-pass filter is provided having a cut-off frequency below the switching frequency of the controlled supply for suppressing this switching frequency.

9. A line circuit as claimed in claim 7, characterized in that a differential amplifier circuit for amplifying the difference between a proportional portion of the output voltage of the amplifier and a reference voltage is arranged between the detector and the contol input of the controlled supply.

10. A line circuit as claimed in claim 7, characterized in that the controlled supply comprises an ac-dc converter which is coupled to the control input and used for converting the difference signal into a pulse duration modulated pulse train the pulse duration of which is proportional to the amplitude of the voltage of the difference signal, and a second rectifier circuit coupled to the converter, the output terminals of this second rectifier circuit constituting the poles of the supply source.

11. A line circuit as claimed in any one of the claims 1 to 4 inclusive, comprising a second driver stage complementary to the said driver stage, an output transistor of the amplifier of the second driver stage being coupled to a second pole of the supply source for taking, via the main current path of the output transistor of the second driver stage, the direct current having superimposed thereupon the alternating current originating from the signal source connected to a second signal input, from the subscriber's line wire which is connected to a second terminal, characterized in that the controlled supply comprises an analog-to-digital converter coupled to the two driver stages for converting the voltage between the output of the amplifier into a digital input signal, a storage device connected to the analog-to-digital converter, a conversion table being stored in a storage device for converting the digital input signal into a digital output signal which is representative of a supply voltage associated with that input signal, a digital-to-analog converter connected to the storage device for converting the digital output signal into a signal voltage, a second converter connected to the digital-to-analog converter for converting the signal voltage applied to this converter into a pulse duration modulated pulse train whose pulse duration is proportional to the amplitude of the voltage of the signal voltage applied to the converter and also comprising, coupled to the converter, a third rectifying circuit whose output terminals constitute the poles of the supply source.

* * * * *